United States Patent
Beelman, III et al.

(10) Patent No.: US 9,758,083 B1
(45) Date of Patent: Sep. 12, 2017

(54) PNEUMATIC TANK TRAILER

(71) Applicants: Frank J. Beelman, III, Freeburg, IL (US); David Smith, Alpine, UT (US)

(72) Inventors: Frank J. Beelman, III, Freeburg, IL (US); David Smith, Alpine, UT (US)

(73) Assignee: Racehorse Investments, L.L.C., East St. Louis, IL (US)

( * ) Notice: Subject to any disclaimer, the term of this patent is extended or adjusted under 35 U.S.C. 154(b) by 0 days.

(21) Appl. No.: 14/515,708

(22) Filed: Oct. 16, 2014

Related U.S. Application Data

(60) Provisional application No. 61/891,630, filed on Oct. 16, 2013.

(51) Int. Cl.
*B60P 1/60* (2006.01)
*B60P 3/22* (2006.01)

(52) U.S. Cl.
CPC ............ *B60P 3/2245* (2013.01); *B60P 3/221* (2013.01)

(58) Field of Classification Search
CPC .... B60K 3/00; B60K 6/08; B60P 1/60; B65D 25/22; B65D 25/24; B65D 11/28; B65D 88/128; B65D 88/129; B65D 90/12
USPC ........... 406/39, 40, 41, 42, 43, 44, 127, 144; 220/4.14, 564; 296/15; 410/68; D12/95; 280/836–839
See application file for complete search history.

(56) References Cited

U.S. PATENT DOCUMENTS

| | | | |
|---|---|---|---|
| RE8,071 E | 2/1878 | McGarry | |
| 1,081,032 A | 12/1913 | Evens | |
| 2,038,265 A | 4/1936 | Bradley | |
| 2,086,134 A | 7/1937 | Ludwick | |
| 2,097,113 A | 10/1937 | Bradley | |
| 2,119,671 A | 6/1938 | Francis | |
| 2,185,030 A | 12/1939 | Lockwood | |
| 2,616,758 A | 11/1952 | Meyers | |
| 2,626,813 A | 1/1953 | Edward | |
| D170,969 S | 12/1953 | Clough | |
| 2,689,462 A | 9/1954 | Brandon | |
| 2,721,006 A * | 10/1955 | Knutsen | B65D 88/72 222/462 |
| 3,058,753 A | 10/1962 | Carlsen | |

(Continued)

FOREIGN PATENT DOCUMENTS

| | | |
|---|---|---|
| CA | 2212020 A1 | 8/1997 |
| WO | 2008125863 A1 | 10/2008 |

OTHER PUBLICATIONS

Product News, Sep. 2013, prior Fruehof tank trailer configuration, http://www.1087vehicles.org/New%20Products/13_sep.php; printed Apr. 14, 2015.

(Continued)

*Primary Examiner* — Joseph Dillon, Jr.
(74) *Attorney, Agent, or Firm* — Senniger Powers LLP

(57) ABSTRACT

A pneumatic tank trailer is described. A front end cover is positioned over a front portion of the pneumatic tank trailer. The front end cover partially covers and attaches to a front end cone of the tank. The front end cover also covers plumbing and fittings for a pressurization system of the pneumatic tank trailer. The front end cover improves the aerodynamics of the trailer by providing a smooth surface with a large radius transition from the front cover to the tank.

23 Claims, 13 Drawing Sheets

(56) References Cited

U.S. PATENT DOCUMENTS

| | | | | |
|---|---|---|---|---|
| 3,139,286 A | * | 6/1964 | Johnson | B60P 3/221 105/248 |
| 3,187,766 A | * | 6/1965 | Black | B60P 3/225 137/267 |
| 3,252,431 A | | 5/1966 | Phillips | |
| 3,311,269 A | | 3/1967 | Mendez | |
| 3,325,177 A | | 6/1967 | Arthur | |
| 3,419,310 A | | 12/1968 | Gramlich | |
| 3,543,692 A | | 12/1970 | Stark et al. | |
| 3,679,082 A | | 7/1972 | Gramlich | |
| 3,883,148 A | * | 5/1975 | Miller | B65D 88/26 105/358 |
| 3,917,084 A | | 11/1975 | Swisher, Jr. et al. | |
| 4,188,152 A | | 2/1980 | Kitt | |
| 4,230,048 A | | 10/1980 | Gordon et al. | |
| 4,258,953 A | | 3/1981 | Johnson | |
| 4,348,047 A | | 9/1982 | Harshman | |
| D274,322 S | | 6/1984 | Hayes | |
| 4,606,570 A | | 8/1986 | Neumann | |
| 4,643,475 A | | 2/1987 | Neumann | |
| 4,729,570 A | * | 3/1988 | Welch, Jr. | B60P 3/2225 105/358 |
| 4,741,569 A | | 5/1988 | Sutphen | |
| 4,818,024 A | | 4/1989 | Michel | |
| 4,884,923 A | * | 12/1989 | Wellink | B65D 88/32 137/243 |
| 4,899,901 A | * | 2/1990 | Nickel | B65D 88/54 220/647 |
| 5,064,091 A | * | 11/1991 | Gerhard | B65D 88/128 220/1.5 |
| 5,326,156 A | | 7/1994 | Heider et al. | |
| 5,630,625 A | * | 5/1997 | Shaw | B60G 11/27 180/209 |
| RE35,580 E | | 8/1997 | Heider et al. | |
| 5,782,524 A | | 7/1998 | Heider et al. | |
| 5,819,970 A | | 10/1998 | Solimar | |
| 5,855,456 A | * | 1/1999 | Mueller | B65G 53/525 406/11 |
| 5,911,337 A | | 6/1999 | Bedeker | |
| 6,173,991 B1 | | 1/2001 | Piona et al. | |
| 6,196,590 B1 | | 3/2001 | Kim | |
| 6,286,894 B1 | | 9/2001 | Kingham | |
| 6,457,630 B1 | | 10/2002 | Nilsson | |
| 6,666,498 B1 | | 12/2003 | Whitten | |
| 6,948,887 B1 | * | 9/2005 | Yielding | B60P 1/60 222/399 |
| 7,108,315 B1 | * | 9/2006 | McCloud | B60P 3/2215 280/107 |
| D542,185 S | | 5/2007 | Remington | |
| D544,815 S | | 6/2007 | Williams | |
| D546,245 S | | 7/2007 | Heard | |
| 7,488,030 B2 | | 2/2009 | Nadeau | |
| 7,516,908 B1 | * | 4/2009 | Sack | A62C 3/0207 169/24 |
| 7,540,695 B2 | * | 6/2009 | Snowdon | B65D 88/128 406/119 |
| 7,651,114 B2 | | 1/2010 | Weber et al. | |
| 7,712,820 B1 | | 5/2010 | Kyle | |
| 7,795,837 B1 | | 9/2010 | Haun et al. | |
| 7,967,369 B2 | | 6/2011 | Davidson | |
| 8,025,329 B1 | | 9/2011 | Kron | |
| 8,066,318 B2 | | 11/2011 | Mazzarelli et al. | |
| 8,082,698 B2 | | 12/2011 | Drake | |
| 8,186,745 B2 | | 5/2012 | Graham et al. | |
| D662,461 S | | 6/2012 | Fu et al. | |
| 8,308,213 B1 | | 11/2012 | Sharkey | |
| 8,573,680 B2 | | 11/2013 | Smith | |
| D716,701 S | | 11/2014 | Beelman, III | |
| 9,266,459 B2 | * | 2/2016 | Yielding | B60P 1/56 |
| 2003/0075915 A1 | | 4/2003 | Kim | |
| 2003/0132644 A1 | | 7/2003 | Crews | |
| 2006/0049661 A1 | | 3/2006 | Mazzarelli et al. | |
| 2008/0073895 A1 | | 3/2008 | Herman et al. | |
| 2008/0190929 A1 | | 8/2008 | Gloor et al. | |
| 2008/0211259 A1 | | 9/2008 | Nadeau | |
| 2008/0265617 A1 | | 10/2008 | Davidson | |
| 2009/0085394 A1 | | 4/2009 | Lemmons | |
| 2009/0145905 A1 | | 6/2009 | Kim | |
| 2010/0308063 A1 | | 12/2010 | Pu et al. | |
| 2010/0320725 A1 | | 12/2010 | Thorpe, Sr. | |
| 2011/0049207 A1 | | 3/2011 | Hufgard | |
| 2011/0198145 A1 | | 8/2011 | Bullis | |
| 2011/0209418 A1 | | 9/2011 | Drake | |
| 2014/0353999 A1 | * | 12/2014 | Yielding | B60P 1/56 296/24.3 |
| 2015/0137501 A1 | * | 5/2015 | Kibler | B60P 3/221 280/837 |
| 2015/0314815 A9 | * | 11/2015 | Yielding | B60P 1/56 296/24.3 |

OTHER PUBLICATIONS

Robert Lafreniére Truck Pictures—Bulk Hauler Trucks, four pages, last updated Feb. 28, 2014.

\* cited by examiner

PNEUMATIC TANK TRAILER

CROSS REFERENCE TO RELATED APPLICATION

This application claims the benefit of U.S. Provisional Patent Application No. 61/891,630 filed Oct. 16, 2013, which is hereby incorporated by reference in its entirety.

FIELD OF INVENTION

The present invention relates to a pneumatic tank trailer.

BACKGROUND OF INVENTION

Pneumatic tank trailers are commonly used to haul a variety of dry bulk materials, such as, for example, lime products, cement, fly ash, food products, etc. The pneumatic tank trailers include a tank that receives the dry bulk materials. The materials are loaded through manholes located on a top of the tank. The tank typically includes pressurizing systems to facilitate unloading of the dry bulk materials. The tank typically includes one or more hoppers positioned along an approximate bottom surface of the tank and trailer. These hoppers promote the discharge of the dry bulk materials from the trailer. Aeration systems engaged to the hoppers may also assist in fluidizing the dry bulk materials. The hoppers typically include angled walls that lead to a discharge pipe or conduit. A combination of the aeration systems, the pressurizing systems, blowers, and gravity cause the dry bulk materials to discharge from the discharge pipe or conduit.

Pneumatic tank trailers are almost always equipped with at least one, and typically several, hose tubes that store hoses that connect the tank trailer to the silo equipment. The hose tubes are generally an added component that merely fastens to the tank with no other purpose than to house the hoses.

Pneumatic tank trailers generally have round or ovular cross-sections which accommodate the pressure received from the pressurizing system. However, filling such round or ovular tanks with materials (many materials commonly hauled in a pneumatic trailer have an approximate 45 degree angle of repose), may leave a substantial amount of dead, unused space in the trailer. The dead space in the trailer is undesirable as it increases the time necessary to pressurize the tank, and leaves unused capacity in the trailer that still needs to be hauled. Hauling dead space is inefficient. By reducing dead space in the tank of the trailer, a trailer is made more efficient since the trailer can be filled more to capacity. Often, drivers will try to minimize the amount of dead space in the trailer by shaking down the load. Shaking down the load is done by pressurizing the tank, and/or moving the trailer forward and then stopping abruptly, causing the materials in the tank to shift. This fills some of the dead space and allows more material to be loaded through the manholes in order to top off the trailer. Some drivers will shake down the load multiple times. Shaking down a load is undesirable because it takes a significant amount of time and is hard on the trailer. It is an aspect of the present invention to provide a trailer that can be loaded to capacity with single pass loading and/or can be loaded to capacity without shaking the load down.

A front region of a conventional pneumatic tank trailer is generally exposed to oncoming air during travel. The front region of the conventional pneumatic tank trailer faces generally perpendicular to the direction of travel, and the front region is exposed to the oncoming air and creates turbulence, as the air strikes against various plumbing fittings and structural members positioned at the front of the trailer. This front region often includes the structural and support members as well as plumbing, parts of plumbing, fittings, valves, and pipes for the pressurizing systems. When the trailer is moving, wind and air strike the front of the trailer, plumbing, fittings, and pipes thus creating turbulence and drag. This turbulent air is directed about the trailer, resulting in reduced fuel efficiency for the vehicle towing the pneumatic tank trailer.

External vertical ribs are often positioned generally perpendicular to a length of a tank on pneumatic trailers. The external vertical ribs are usually positioned on the external surface of the tank generally perpendicular to a length of a tank. The external vertical ribs generally extend all the way around the tank. The external vertical ribs may be used to reinforce a joint between adjacent segments, or reduce the stress in the tank as it is pressurized. The external vertical ribs cause wind resistance and drag, and thus reduce fuel efficiency.

SUMMARY OF INVENTION

A pneumatic tank trailer with improved aerodynamic efficiency is described. A pneumatic tank trailer with several functional improvements is described.

The pneumatic tank trailer includes a tank. A front end cover is positioned over a front portion of the pneumatic tank trailer. The front end cover partially covers and attaches to a front end cone of the tank. The front end cover also covers plumbing and fittings for a pressurization system of the pneumatic tank trailer. The front end cover improves the aerodynamics of the trailer by providing a smooth surface with a large radius transition from the front cover to the tank.

DETAILED DESCRIPTION OF INVENTION

Figure 1:
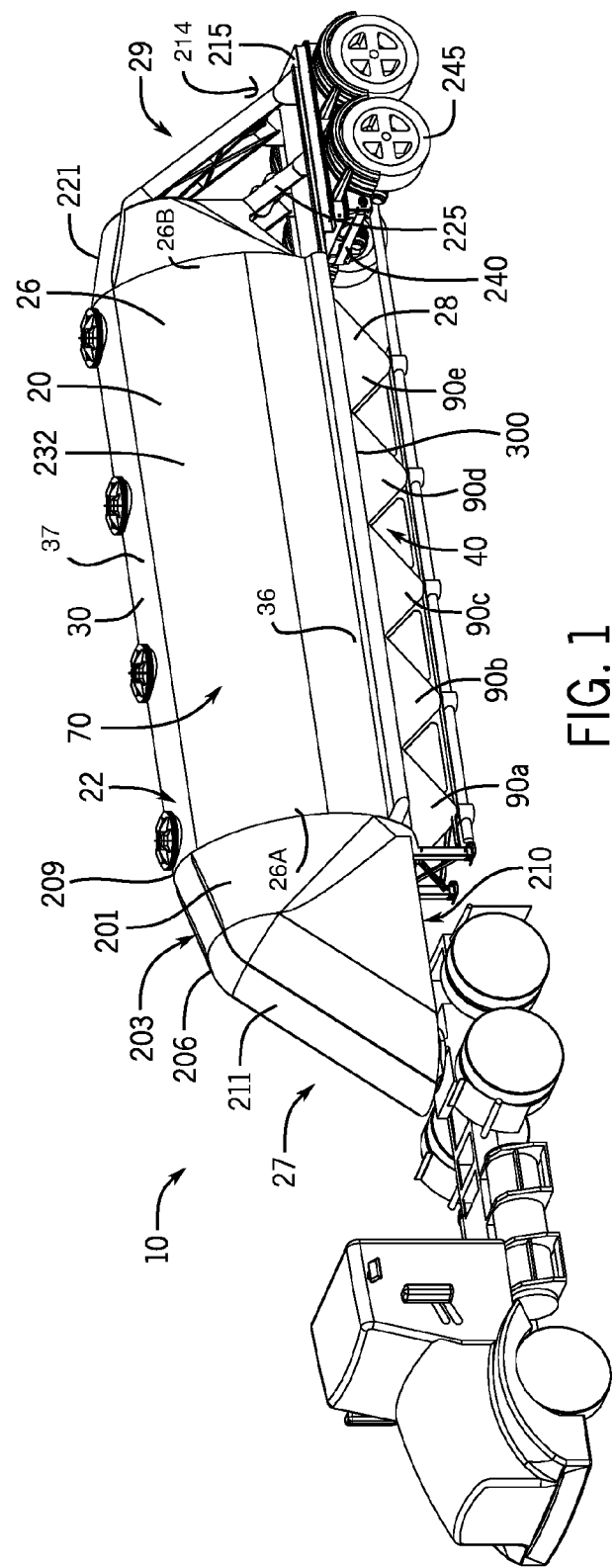
FIG. 1 is a perspective view of the pneumatic tank trailer and tractor combination.

A pneumatic tank trailer 10 and components thereof are shown in FIGS. 1-14. The pneumatic tank trailer 10 includes a tank 20 that defines an interior volume 25. The tank 20 is the holding section of the pneumatic tank trailer 10 that can be pressurized. The pneumatic tank trailer 10 includes a front end portion 27 that is proximate a king pin of the pneumatic trailer 10. The king pin connects the pneumatic tank trailer 10 to the tractor or other towing vehicle. The pneumatic tank trailer 10 includes a rear end portion 29 proximate a carriage 214 comprising a deck 215 and rear wheels 245 of the pneumatic tank trailer 10. The interior volume 25 may be pressurized to facilitate unloading of the dry bulk material.

The pneumatic tank trailer 10 includes an aerodynamic shape that improves fuel efficiency. The pneumatic tank trailer 10 may be designed for traveling over one million miles during its lifetime, and aerodynamic efficiency results in significant fuel costs savings. As described below, the pneumatic tank trailer 10 includes several features to reduce weight and improve aerodynamic efficiency and thereby reduce fuel costs. The tank trailer 10 also includes several features to improve the operation and function of the tank trailer 10.

The pneumatic tank trailer 10 has a generally smooth top surface and sides, with no external vertical ribs aligned generally perpendicular to the direction of travel. The generally smooth top surface and sides help increase aerodynamic efficiency.

Figure 6:
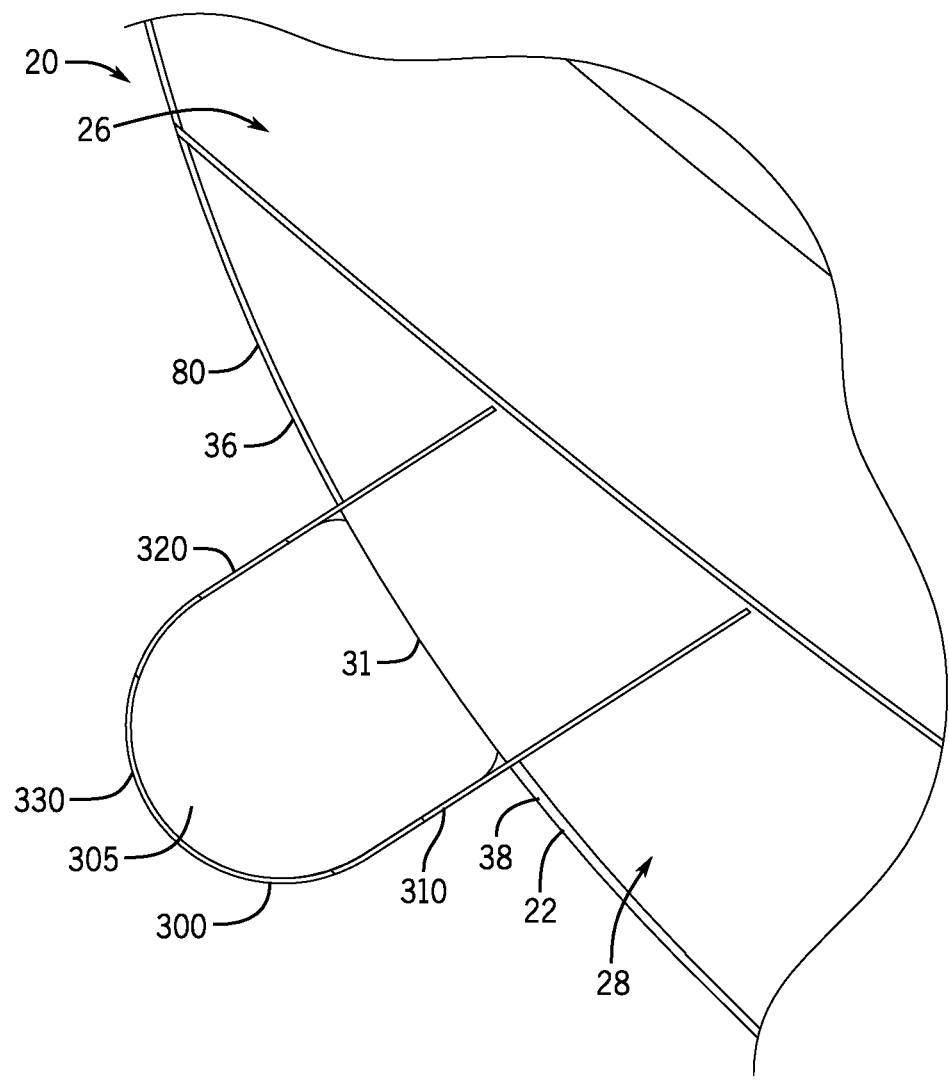
FIG. 6 is a sectional view of the tank and the hose tube.

The tank 20 includes a barrel portion 26 comprising an upper barrel portion 37 defining a top surface 30 and a lower barrel portion 36 defining side surfaces 70, 80 generally positioned above a hopper portion 28. The barrel portion 26 has a front end margin 26A and a rear end margin 26B. As shown in FIG. 6, the barrel portion 26 and the hopper portion 28 are generally joined together along a joining region 31. The hopper portion 28 includes an upper hopper portion wall 38 that engages a lower barrel portion wall 36 of the barrel portion 26 at the joining region 31. The engagement between barrel portion 26 and the hopper portion 38 at the joining region 31 may include a seam, intersection, or other interconnection.

The front end portion 27 of the pneumatic tank trailer 10 also contributes to the improved aerodynamic efficiency. The front end portion 27 faces the direction of travel, and the front end portion 27 is generally exposed to the oncoming air. A front end cover 211 generally encloses the front end portion 27 of the trailer 10. A front of the tank 20 includes a front end cone 201. The front end cone 201 is integral with the barrel portion 26 of the tank 20. The front end cover 211 blends into the front end cone 201.

The front end cover 211 covers fittings and structural members to improve the aerodynamic efficiency of the pneumatic tank trailer 10. The combination of the front end cone 201 and the front end cover 211 provides for less turbulent air to pass over and to the sides of the pneumatic tank trailer 10. A seam 206 between the front end cone 201 and the front end cover 211 is made generally smooth. Likewise, a transition 209 between the front end cone 201 and the remainder of the tank 20 is made generally smooth.

Figure 2:
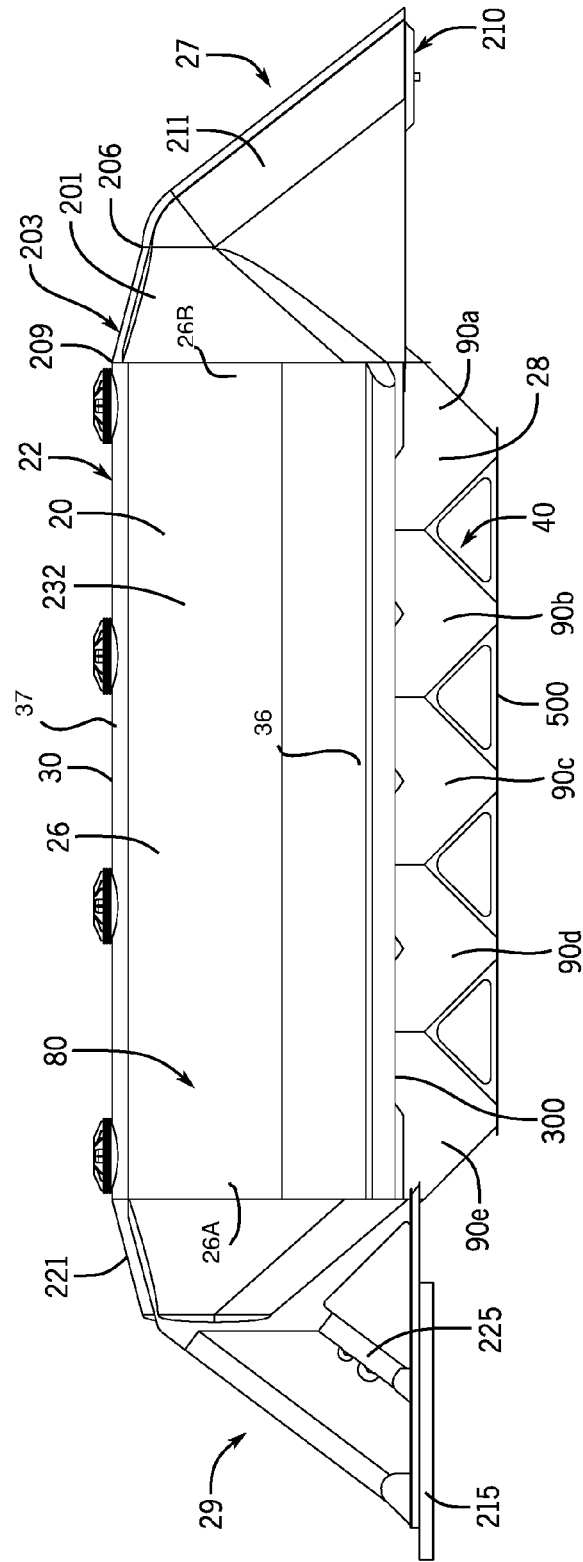
FIG. 2 is a side view of the tank.
Figure 5:
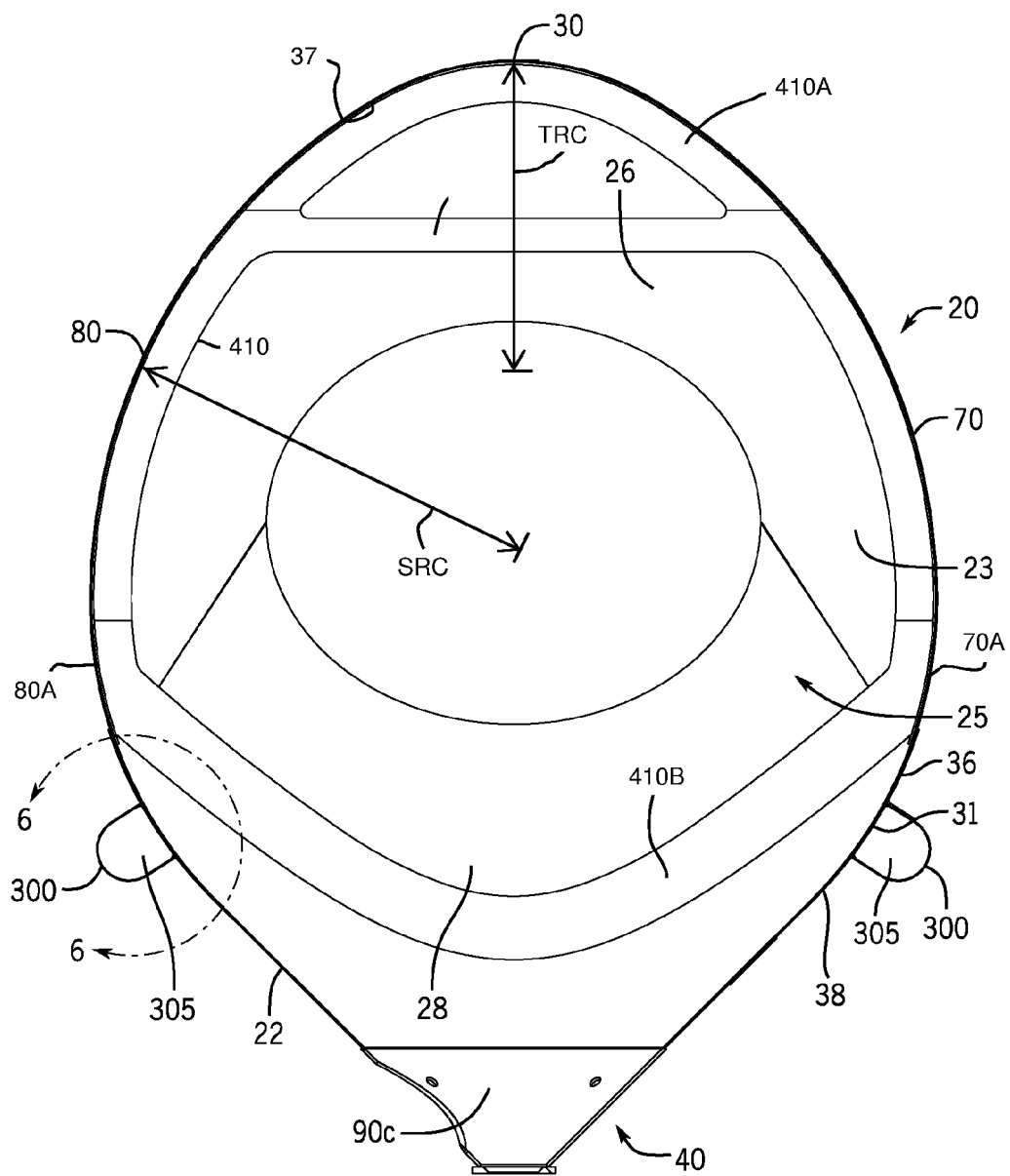
FIG. 5 is a sectional view of the tank.

The pneumatic tank trailer 10 includes a top surface 30 generally opposite of a bottom surface 40. The bottom surface 40 is formed from one or more hoppers 90a-e of the hopper portion 28. The top surface 30 of the tank 20 is generally smooth and has zero slope longitudinally for most of or a majority of its length. As shown in FIG. 5, the top surface 30 has a minimum cross-sectional radius of curvature TRC. The top surface 30 blends into the front end cone 201 at the transition 209. With reference to FIG. 2, a side view of the trailer 10 shows the sloping shape of the front end cone 201.

The barrel portion 26 of pneumatic tank trailer 10 also includes a first side surface 70 generally opposite of a second side surface 80. As shown in FIG. 5, the sides 70, 80 each have a minimum cross-sectional radius of curvature SRC and bottom end segments 70A, 80A that slope inwardly toward the hopper portion 28. The minimum cross-sectional radius of curvature TRC of the top 30 is less than the minimum cross-sectional radius of curvature SRC of the sides 70, 80. The barrel portion 26 may be welded or otherwise mechanically attached to or over the hoppers 90a-e of the hopper portion 28 in an air tight fashion. The side surfaces 70 and 80 provide a smooth, aerodynamic surface that attaches to upper edges of the hoppers 90a-e. The first and second side surfaces 70 and 80 of the pneumatic tank trailer 10 are generally smooth, with no external vertical ribs, to help increase aerodynamics. The side surfaces 70 and 80 transition into the lower barrel portion wall 36, which joins with the hopper portion 28 at the joining region 31.

The front end portion 27 of the pneumatic tank trailer 10 will now be further described. The front end cone 201 is generally positioned forward of the first hopper 90a. The front end cone 201 may include a sloping external surface 203. The front end cover 211 connects a front deck 210 and the front end cone 201. The front end cover 211 defines an interior that encloses or covers plumbing and structural members of the front deck 210. The front end cone 201 provides an aerodynamic transition between the front end cover 211 and the top surface 30 of the tank 20.

The pneumatic tank trailer 10 includes the front end cone 201 that slopes down at an angle between approximately 5 and 15 degrees from a horizontal plane. The front end cone 201 slopes down from the top surface 30 of the barrel portion 26 and in from the side surfaces 70 and 80 of the barrel portion 26 at an angle of approximately between 5 and 15 degrees. The front end cover 211 comprises a large radius to allow air to flow smoothly over the front end cover 211 and front end cone 201 of the front end portion 27. The large radius allows for air to flow smoothly over front end portion 27 and the outer surface 22 of the tank 20, reducing the aerodynamic drag.

The front end cover 211 blends right into the front end cone 201, which then transitions into an outer surface 22 of the tank 20 with no obstructions. This blending of the surfaces of the front end cover 211, the front end cone 201, and the barrel portion 26 of the tank 20 allows for smooth airflow over the outer surface 22 of the tank 20, and also reduces air flow from becoming detached from the tank 20 as the air flows over the tank 20.

The rear end portion 29 of the pneumatic tank trailer 10 will now be described with reference to FIG. 2. A rear of tank 20 includes a rear end cone 221. The rear end cone 221 is integral with the barrel portion 26. The rear end cone 221 is generally rear of the fifth hopper 90e. The rear end cone 221 also slopes down from the top surface 30 and in from the side surfaces 70 and 80 of the barrel portion 26 of the tank 20 at an angle between approximately 5 and 15 degrees from a horizontal plane. The rear end cone 221 attaches to a rear deck 215 via supports 225. The rear end cone 221 assists in providing an aerodynamic profile for the pneumatic tank trailer 10. At the rear end portion 29, the hopper 90e joins with a rear chassis 240 and the rear wheels 245.

Figure 8:
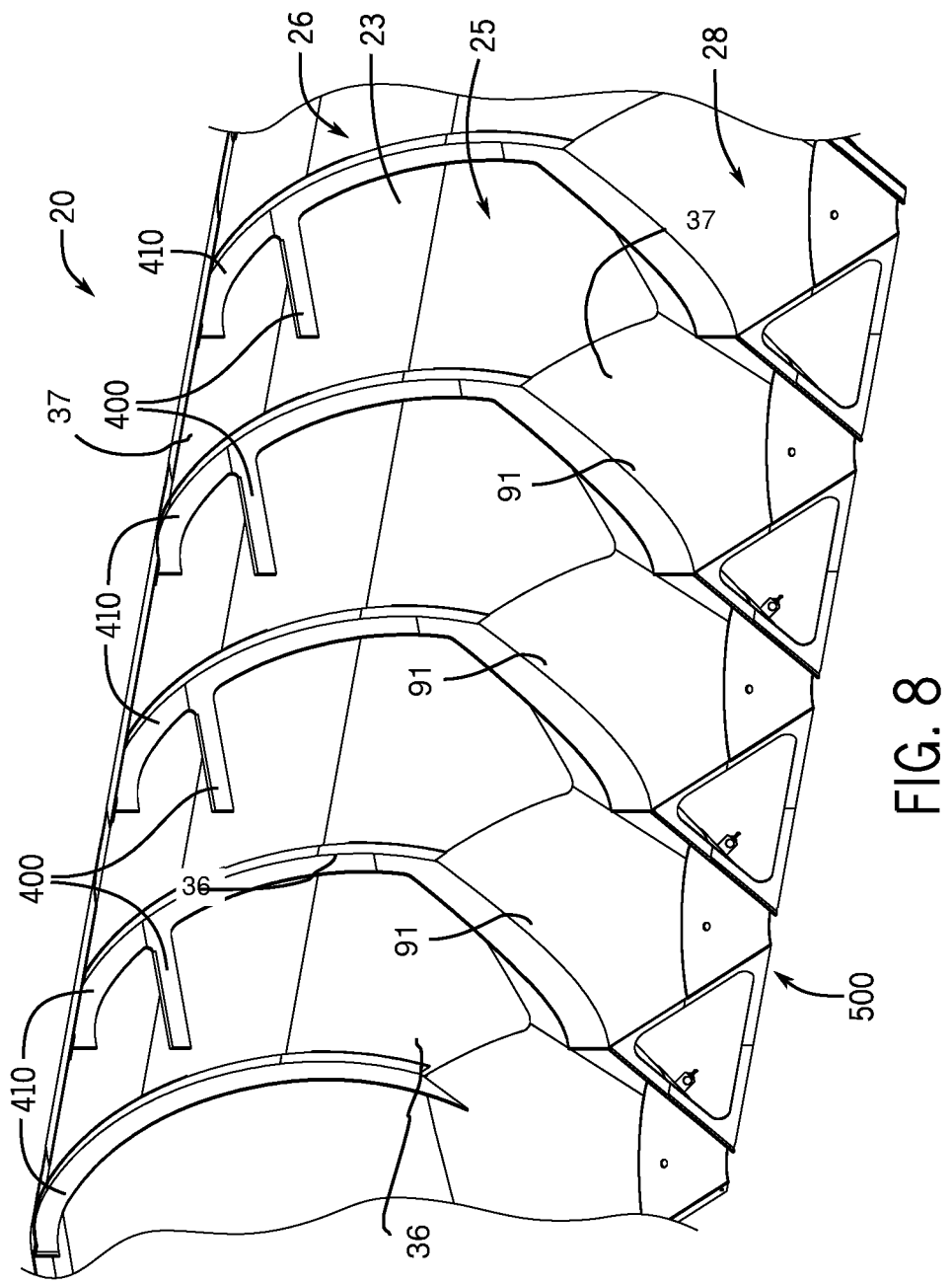
FIG. 8 is a perspective sectional view of the tank.

The hopper portion 28 of the tank 20 includes the one or more hoppers 90a-e joined together at respective hopper joint areas 91 (FIG. 8). With reference to FIG. 2, the hopper portion 28 includes the first hopper 90a, a second hopper 90b, and a third hopper 90c, a fourth hopper 90d, and a fifth hopper 90e. The first hopper 90a is the most forward hopper, i.e., it is the hopper closest to the tractor. The fifth hopper 90e is the most rear hopper. In other aspects, the tank 20 may include fewer or additional hoppers 90. For example, the tank 20 may include one, two, three, four, six, seven or more hoppers 90.

At a bottom surface 40 of the tank 20, the first hopper 90a leads to an opening 95a, the second hopper 90b leads to an opening 95b, the third hopper 90c leads to an opening 95c, the fourth hopper 90d leads to an opening 95d, and the fifth hopper 90e leads to an opening 95e. Each of the hoppers 90a-90e includes angled walls 98a-e leading to the openings 95a-e. The angled walls 98a-e have a cone-shape comprising top end margins adjacent the hopper joint areas 91 (FIG. 8) and bottom end margins adjacent the openings 95a-e that funnels the materials to the openings 95a-e.

Figure 3:
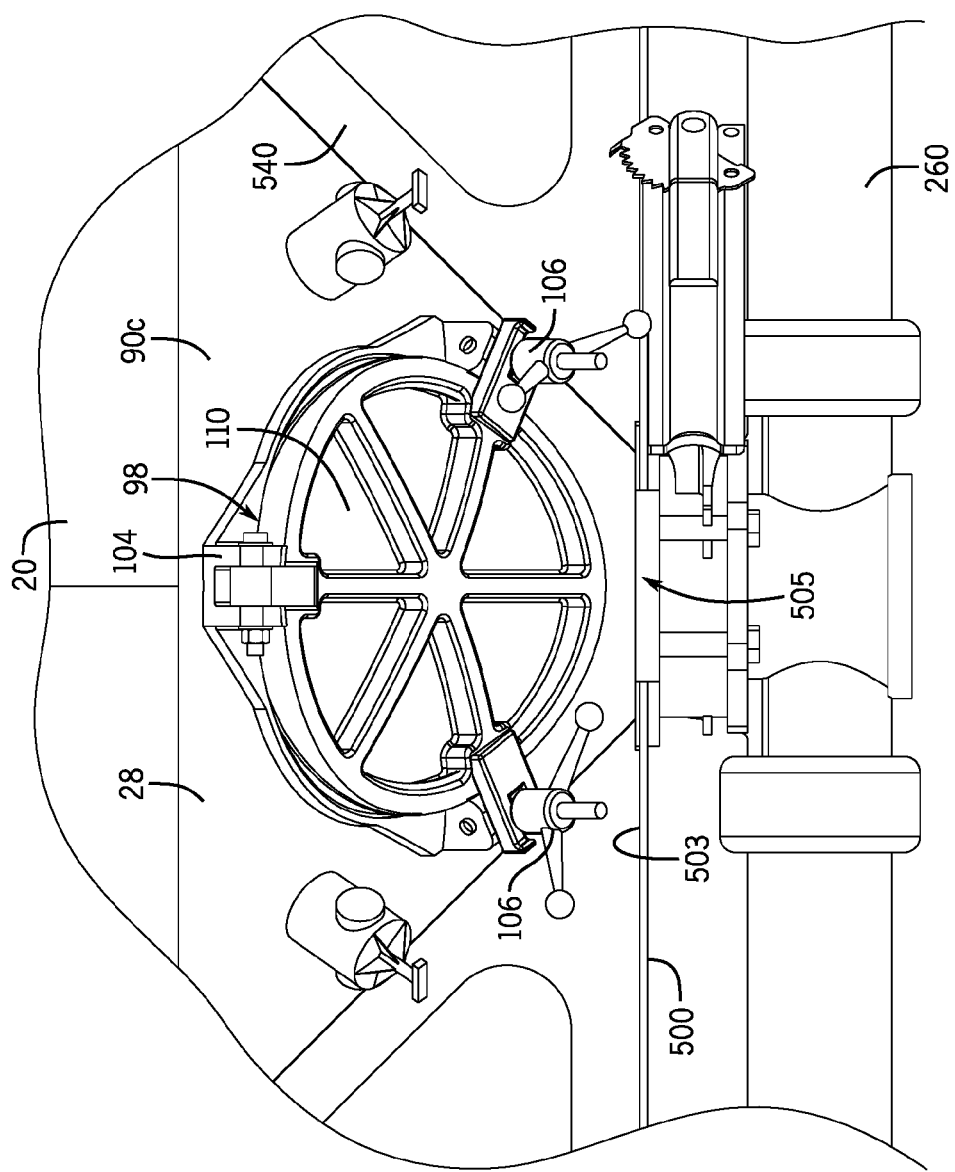
FIG. 3 is a view of the gravity unload hatch.
Figure 4:
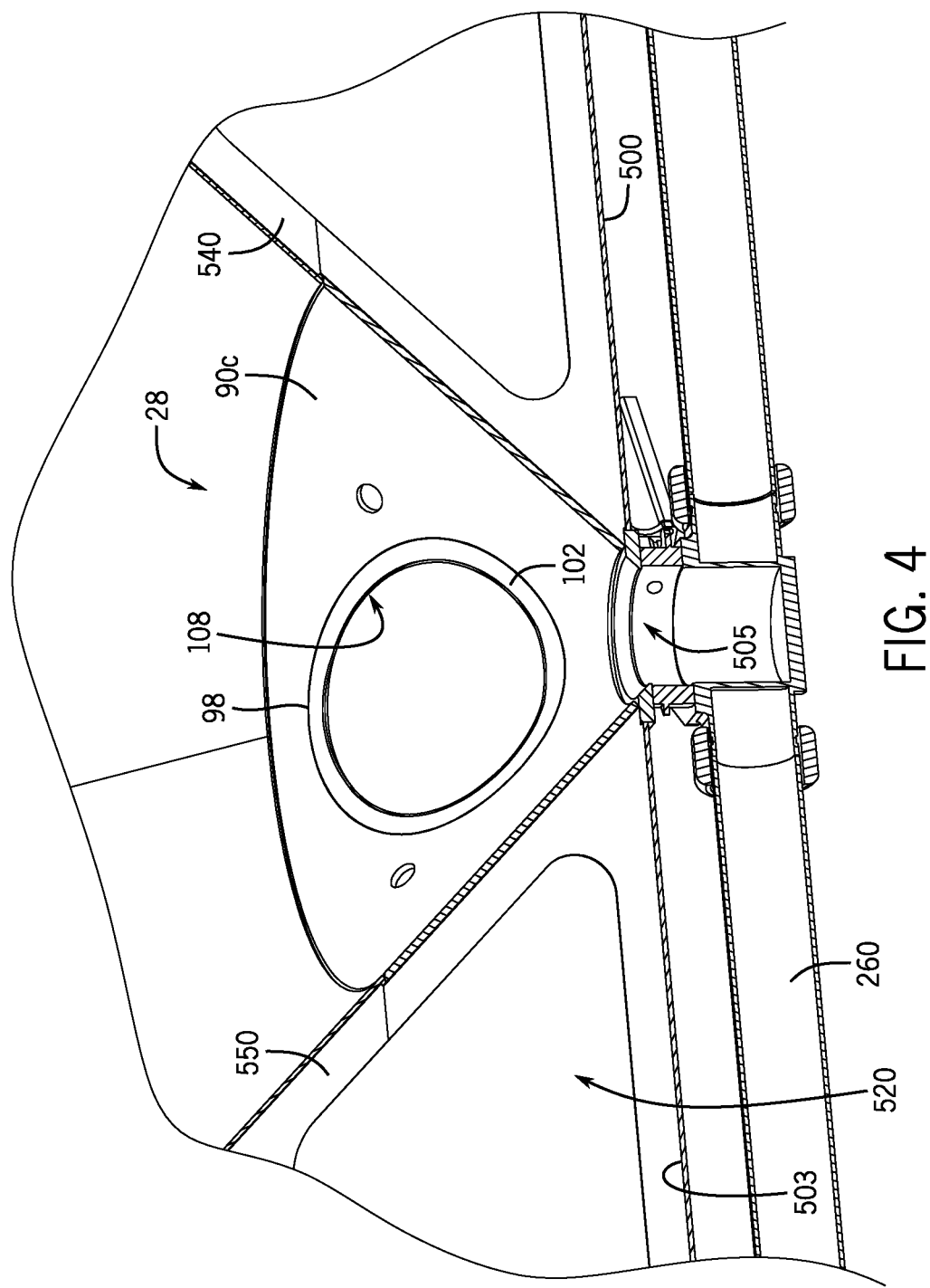
FIG. 4 is a sectional view of the hopper showing the gravity unload hatch from the inside.

An improved gravity unload hatch 110 for the hoppers 90a-e will now be described with reference to FIGS. 3 and 4. One or more of the hoppers 90a-e include the gravity unload hatch 110 for accelerated gravity unloading or dumping of the materials from the tank 20. The gravity unload hatch 110 offers a faster alternative for dumping materials to ground level or areas beneath the tank 20 than conventional unloading methods for a pneumatic trailer. The gravity unload hatch 110 opens and closes a side opening 102 of the hoppers 90a-e. The gravity unload hatch 110 does not impede typical unloading of pneumatic trailer 10. The side opening 102 of the hopper 90 may be fully opened by pivoting the gravity unload hatch 110 on a pivot assembly 104. The gravity unload hatch 110 is attached to the hopper 90a-e over a top edge 98 of the side opening 102. The pivot assembly 104 is affixed to the hopper 90a-e above the top edge 98 of the side opening 102. With the gravity unload hatch 110 attached to the hopper 90a-e at the pivot assembly 104 near the top edge 98 of the side opening 102 and with the gravity unload hatch 110 and opening upwards (towards the top of the tank trailer 10), the material from within the hopper 90a-e does not fall out over the gravity unload hatch 110. As such, the gravity unload hatch 110 does not impede or slow the flow of materials from the side opening 102.

The gravity unload hatch 110 also includes swing bolts 106 that provide for the gravity unload hatch 110 to press tightly against a seal (not shown) creating an airtight barrier as the gravity unload hatch 110 seals closed over the side opening 102. The gravity unload hatch 110 does not deflect further than the compression of the internal seal when the tank 20 is pressurized. The gravity unload hatch 110 mounts flush with an interior surface 108 of the hoppers 90a-c. The gravity unload hatch 110 also has a smooth inner surface that allows for easier cleaning of the hopper 90a-e and prevents material buildup in or around the gravity unload hatch 110.

Hose tubes 300, which strengthen the tank 20, will now be described with reference to FIGS. 5-7. The pneumatic tank trailer 10 includes one or more hose tubes 300 as structural members. The one or more hose tubes 300 act as a sheath or storage area for hoses that connect the tank trailer 10 to the silo equipment. The hoses are stored in the hose tubes 300 during travel from one location to another location.

The one or more hose tubes 300 may strengthen the joining region 31 between the barrel portion 26 and the hopper portion 28. The pneumatic tank trailer 10 may include one hose tube 300 along the first side surface 70 of the tank trailer 10 and a second hose tube 300 along the second side surface 80. The one or more hose tubes 300 are engineered into the tank 20 in order to strengthen the tank 20.

Figure 7:
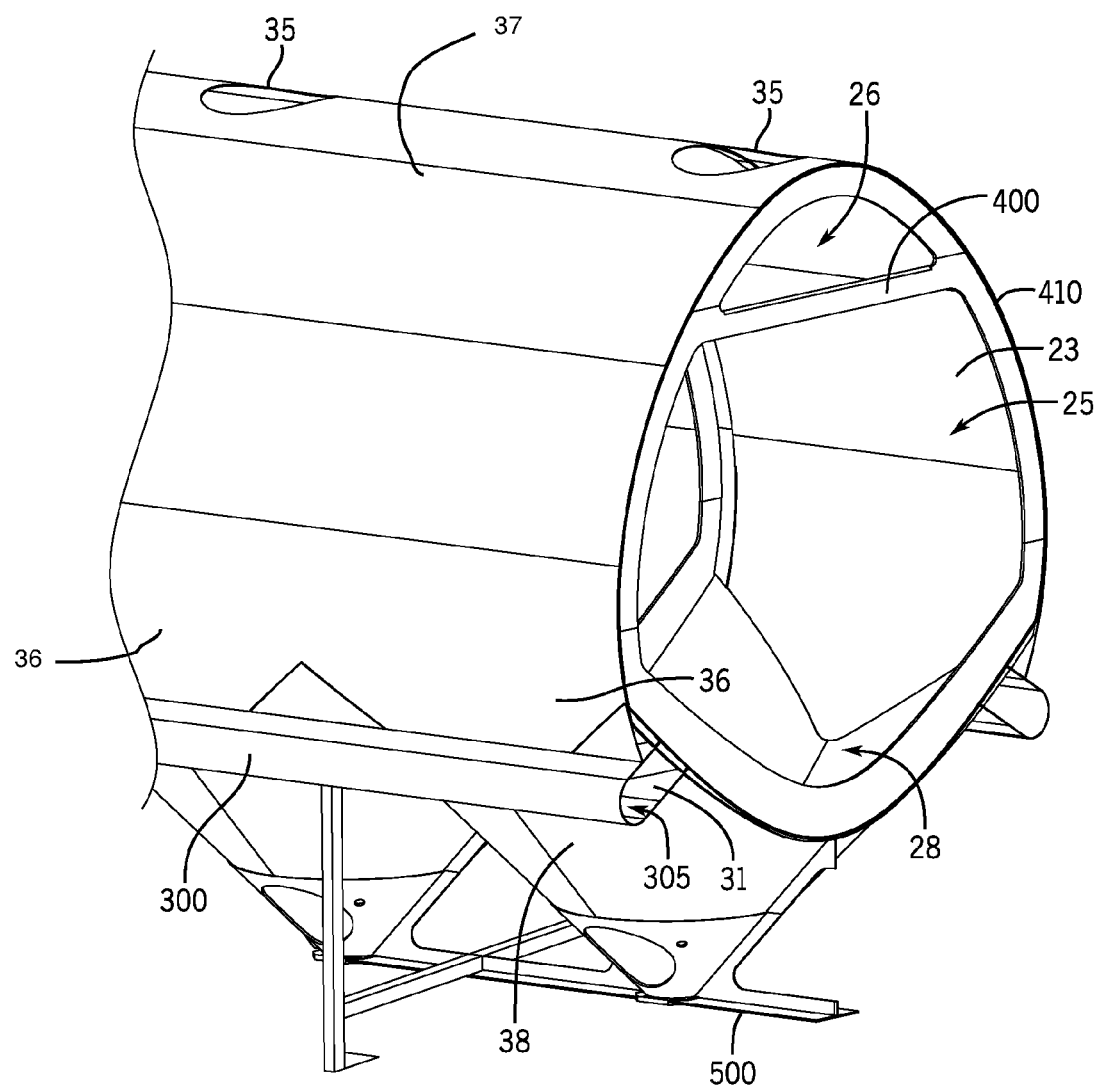
FIG. 7 is a sectional view of the tank and the hose tube.

The hose tubes 300 are shown in detail in FIGS. 5-7. At the joining region 31, the hopper portion 28 curves in and out along a length of the tank 20. Due to the curved outer exterior of the hoppers 90a-e, the joining region 31 includes an irregular or undulating border between the hopper portion 28 and the barrel portion 26. Along the length of the hose tubes 300, the hose tubes 300 may alternatingly connect to the barrel portion 26 and to the hopper portion 28. The pneumatic tank trailer 10 integrates the hose tubes 300 into the tank 20 to add stiffness to the intersection of the hoppers 90a-e and the remainder of the tank 20 and to the intersection of adjacent hoppers 90a-e. These intersections are prone to high stress and cracking, as the shape does not lend itself well to holding pressure. The use of the hose tubes 300 as a structural member decreases this stress without appreciably increasing the weight of the tank trailer 20. Further, as the hose tubes 300 are attached to the tank 20, the interactions of the hoppers 90a-e and the hose tubes 300 cause vortices and/or a recirculation zone to form in an airflow region between the hoppers 90a-e that decreases the aerodynamic drag of the tank trailer 10 when being pulled at highway speed by a tractor.

The hose tubes 300 include an inner open region 305 to contain or store the hoses. With specific reference to FIG. 7, the hose tubes 300 include a lower edge 310 and an upper edge 320. The lower edge 310 transitions into a central curved region 330 that further transitions into the upper edge 320. The lower and upper edges 310 and 320 may include a generally flat cross-section before the lower and the upper edges 310 and 320 transition into the central curved region 330. The lower and upper edges 310 and 320 engage the outer surface 22 of the tank 20. For example, the lower and upper edges 310 and 320 may be welded, riveted, or otherwise mechanically engaged to the tank 20 in an airtight fashion. The lower edge 310 may engage the upper hopper portion wall 38 and the upper edge 320 may engage the lower barrel portion wall 36. The hose tubes 300 may span the joining region 31 between the barrel portion 26 and the hopper portion 28 of the tank trailer 20 in order to improve strength.

The hose tubes 300 may have sufficient length to cover or engage at least a portion of all of the hoppers 90a-e. Typically, the hose tubes 300 will extend along the side of the most forward hopper, i.e., the first hopper 90a, and extend along the side of the most rear hopper, i.e., the fifth hopper 90e. Typically, a first hose tube 300 will extend along the first side surface 70 and a second hose tube 300 will extend along the second side surface 80. In other aspects, the hose tubes 300 may have a squared, box-like, arcuate, or semi-circular shape.

An improved shape for the tank 20 will now be described with reference to FIGS. 5 and 8. The barrel portion 26 of the tank 20 further includes an ovoid shape cross-section, similar to an egg-shape. The barrel portion 26 has its greatest width toward its engagement with the hopper portion 28. The barrel portion 26 is generally narrower in width closer to the top surface 30 and wider in width closer toward the joining region 31. The barrel portion 26 has a smaller radius near the top surface 30 than a radius nearer to the hopper portion 28.

The ovoid egg-shape of the tank 20 significantly reduces the amount of dead space in the tank 20. The dead space is an empty area of the tank 20 which is not filled when a material is loaded into the tank 20 from the top manhole covers 35. This design allows for high percentage first pass fill during the loading of materials into the tank 20, and the design also decreases the amount of time required to pressurize the trailer 10. The egg-shape cross-section of the tank 20 may also allow the trailer 10 to carry a larger load with a smaller cubic foot trailer (e.g., a 1700 cubic foot egg-shaped trailer may hold as much as oval 1800 cubic foot trailer 10 when each are loaded with a single pass). This also increases the aerodynamic efficiency of the trailer 10 by reducing the cross sectional area perpendicular to the area of travel without decreasing the load carrying capacity of the trailer 10.

The interior volume 25 of the tank 20 may be filled with a dry bulk material. The one or more manholes 35 are positioned in the top surface 30. The dry bulk materials are passed through the manholes 35 in order to fill the interior volume 25 of the tank 20 with the dry bulk materials. With the egg-shape of the tank 20, more efficient and even filling of the tank 20 is achieved.

The tank 20 further includes one or more internal cross-supports 400 near an approximate top one-third of the tank 20. The cross-supports 400 extend across the barrel portion 26. The cross-supports 400 help support the tank 20 against the internal pressure from pressurization and the weight of the materials. The internal cross-supports 400 help maintain the cross-sectional area of the barrel portion 26. The stress from pressurization will urge the barrel portion 26 to have a more rounded cross-section. The deflection that occurs when an egg-shaped trailer tries to become round may cause significant stress. However, the cross-supports 400 placed between the internal ribs 410 significantly decrease the stress in the egg-shaped tank 20.

The one or more internal cross-supports 400 are positioned in the barrel portion 26 of the tank 20. The tank 20 further includes internal ribs 410 comprising perimeter portions that engage an inner surface 23 of the tank 20. As shown in FIG. 5, the perimeter portion of each rib 410 includes a top segment 410A and a bottom perimeter portion 410B. The cross support 400 is downwardly spaced from the top segment 410A and the bottom perimeter portion 410B is joined to a respective hopper joint a rear 91. The internal ribs 410 have a generally vertical orientation, and line the inner surface 23 of the tank 20. The cross-supports 400 extend in a direction generally perpendicular to the direction of travel of the tank trailer 10. The cross-supports 400 are engaged to the internal ribs 410, and the cross-supports 400 extend the entire span between the internal ribs 410, i.e., the width of the tank 20. The cross-supports 400 may pass through the interior 25 of the tank 20. The cross supports 400 are manufactured to have no or very little upward facing surfaces so that materials will not be caught on the cross supports 400. The cross supports 400 are also connected to the internal ribs 410 with a large radius to facilitate cleaning of the tank 20.

Figure 9:
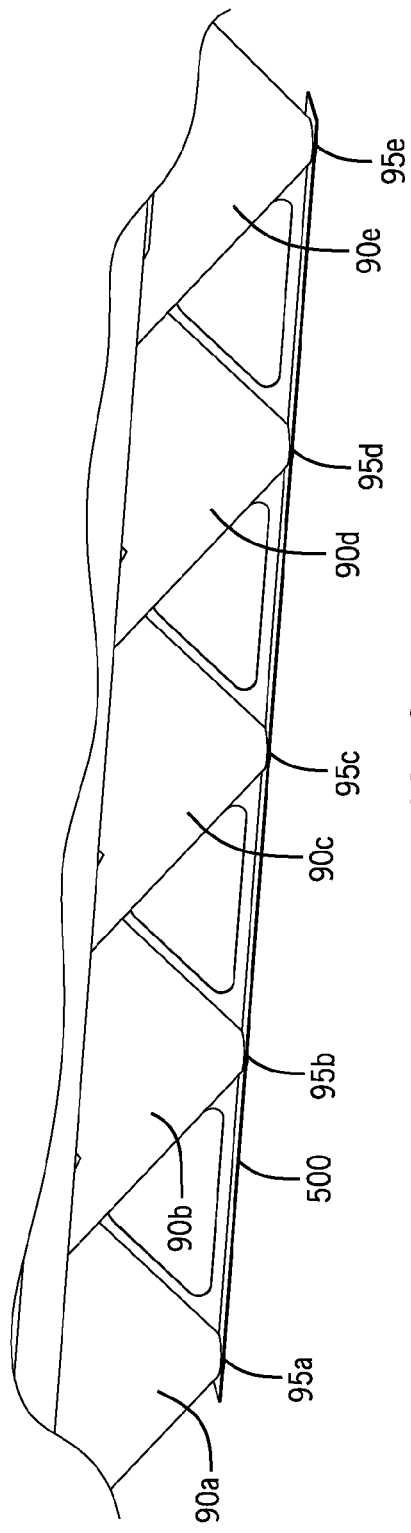
FIG. 9 is a perspective view of the bottom rail.

An improved frameless design for the trailer 10 will now be described with reference to FIGS. 9 and 10. The tank 20 further includes a bottom rail 500. By eliminating the typical side frames used in many conventional tank trailers, the weight of the trailer 20 is reduced and fuel efficiency is improved. The bottom rail 500 is mounted to the tank 20. The bottom rail 500 also limits the deflection of the hoppers 90a-e and helps to maintain the stresses at an acceptable level. The bottom rail 500 also makes it easier to manufacture the trailer 20 right side up.

Figure 10:
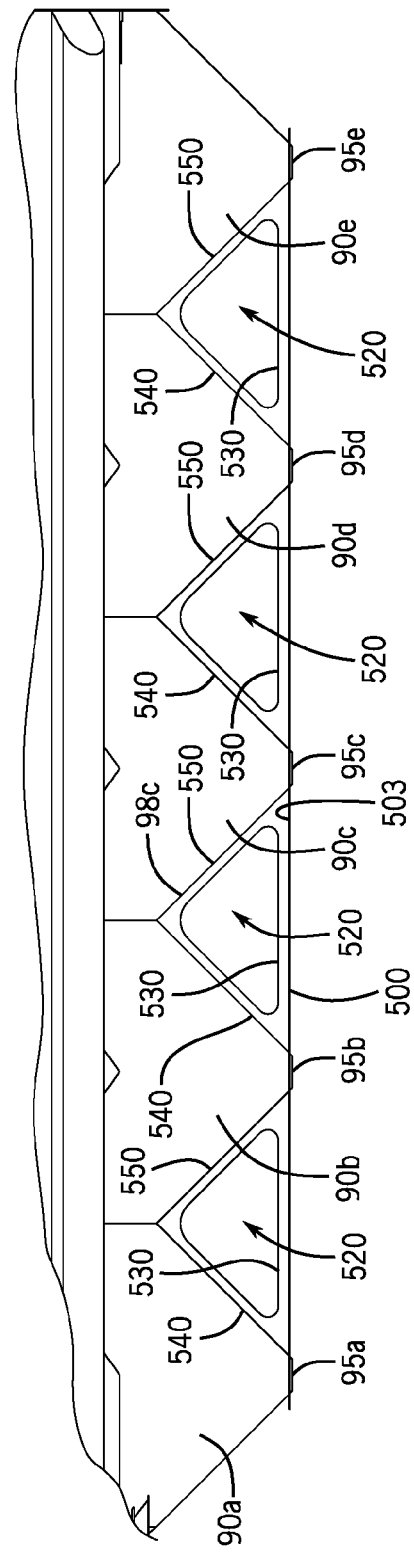
FIG. 10 is a side view of the hoppers and the bottom rail.

With reference to FIG. 10, the bottom rail 500 extends along the bottom of the hoppers 90a-e from the most forward hopper 90a to the most rear hopper 90e. The bottom rail 500 lies along a central axis for the trailer 10. The tank 20 may include a single bottom rail 500 as its frame. The tank 20 does not require additional frame members positioned along the bottom surface 40.

The bottom rail 500 is integrated with one or more triangular supports 520. The triangular supports 520 generally include three surfaces. A bottom surface 530 of the triangular support 520 engages a top surface 503 of the bottom rail 500. A front surface 540 of the triangular support 520 engages the exterior surface of one of the hoppers 90a-e, while a rear surface 550 of the triangular support 520 engages the exterior surface of an adjacent hopper 90a-e. Generally, a triangular support 520 is positioned between each hopper 90a-e. For example, the pneumatic tank trailer 10 includes five hoppers 90a-e, and thus four triangular supports 520 are used in order to position a triangular support 520 between each of the hoppers 90a-e.

The bottom rail 500 includes one or more openings 505 positioned to receive the openings 95a-e of the hoppers 90a-e. The hoppers 90a-e may pass through the openings 505 in the bottom rail 500, seal the openings 95a-e against the openings 505 in the bottom rail 500, or seat in the lower openings 505 of the bottom rail 500.

The tank trailer 10 further includes a modular design. The interior 25 of the tank 20 may have a volume of approximately 700 cubic feet of storage to approximately 2500 cubic feet of storage, depending upon the size of the hoppers 90a-e and the number of hoppers 90a-e utilized. The individual hoppers 90a-e may all have a substantially similar or an identical design. The capacity of the pneumatic tank trailer 10 may be increased by adding additional hoppers 90. The same components, i.e., the hoppers 90, front end cones 201, rear end cones 221, and front end covers 211, may be used with trailers 20 of different lengths. The only difference between the trailers 20 would be the number of hoppers 90 and the length of the barrel portion 26. A pneumatic tank trailer 20 with two hoppers 90a-b may provide approximately 700 cubic feet of storage. A pneumatic tank trailer 20 with three hoppers 90a-c may provide approximately 1000 cubic feet of storage. A pneumatic tank trailer 20 with four hoppers 90a-d may provide approximately 1350 cubic feet of storage. A pneumatic tank trailer 20 with five hoppers 90a-e may provide approximately 1800 cubic feet of storage. The pneumatic tank trailer 10 creates a whole family of pneumatic trailers simply by adding hoppers 90 and increasing the length of the barrel portion 26.

The hoppers 90a-e are fluidly connected to a discharge line 260 that extends the approximate length of the pneumatic tank trailer 10. The discharge line 260 includes a discharge opening 262 which provides for discharge of the bulk material from the tank 20. The respective openings 95a-e of the hoppers 90a-e join the discharge line 260 in order to pass the dry bulk material to the discharge line 260. Each of the hoppers 90a-e may include a valve for controlling discharge through their respective openings 95a-e. The hoppers 90a-e may further include aeration systems (not shown) that assist in emptying the tank 20 of the dry bulk material. Such aeration systems are well known to those skilled in the art. During travel, the dry bulk material in the tank 20 may compact, under its weight, in the lower portions of the hoppers 90a-e and the aeration system helps promote flow of the material from the hoppers 90a-e.

The hoppers 90a-e, the front end cone 201, and the rear end cone 221 and the barrel portion 26 may be formed from metals and metal alloy materials, such as aluminum, having a thickness of approximately ⅛ inch to ⅜ inch, although the thickness of the material may vary throughout the construction of the tank 20.

It is another aspect of the present invention to provide a trailer 10 with a lower center of gravity. This increases the stability of the trailer 10 as it is pulled around a corner. It is a further aspect of this invention to provide a trailer 10 that is as short in length as possible while still complying with federal bridge laws. These laws are well known to those skilled in the art. A shorter trailer 10 will be easier to maneuver and will fit into tighter quarters, which may be necessary for the loading and unloading of the tank 20. In order to accomplish these aspects, the trailer 10, in certain aspects, may be made approximately 102 inches wide. The hoppers 90a-e are also more numerous and closer together than on a conventional pneumatic trailer. This increases the amount of material that can be held lower, and thus the center of gravity is lower. These same modifications have also allowed the trailer 10 to be built having a wheel base as short as possible while still complying with federal bridge laws.

Figure 11:
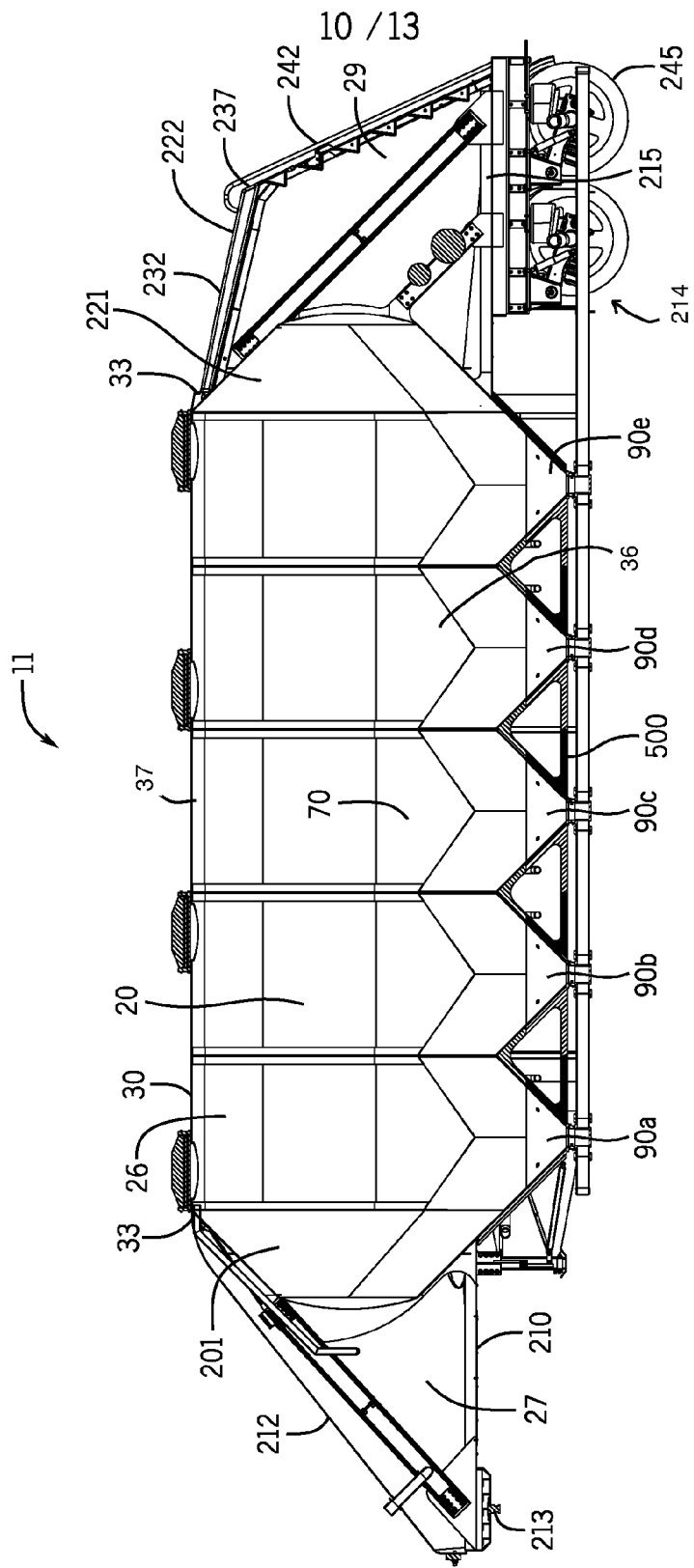
FIG. 11 is a side view of the second trailer.
Figure 12:
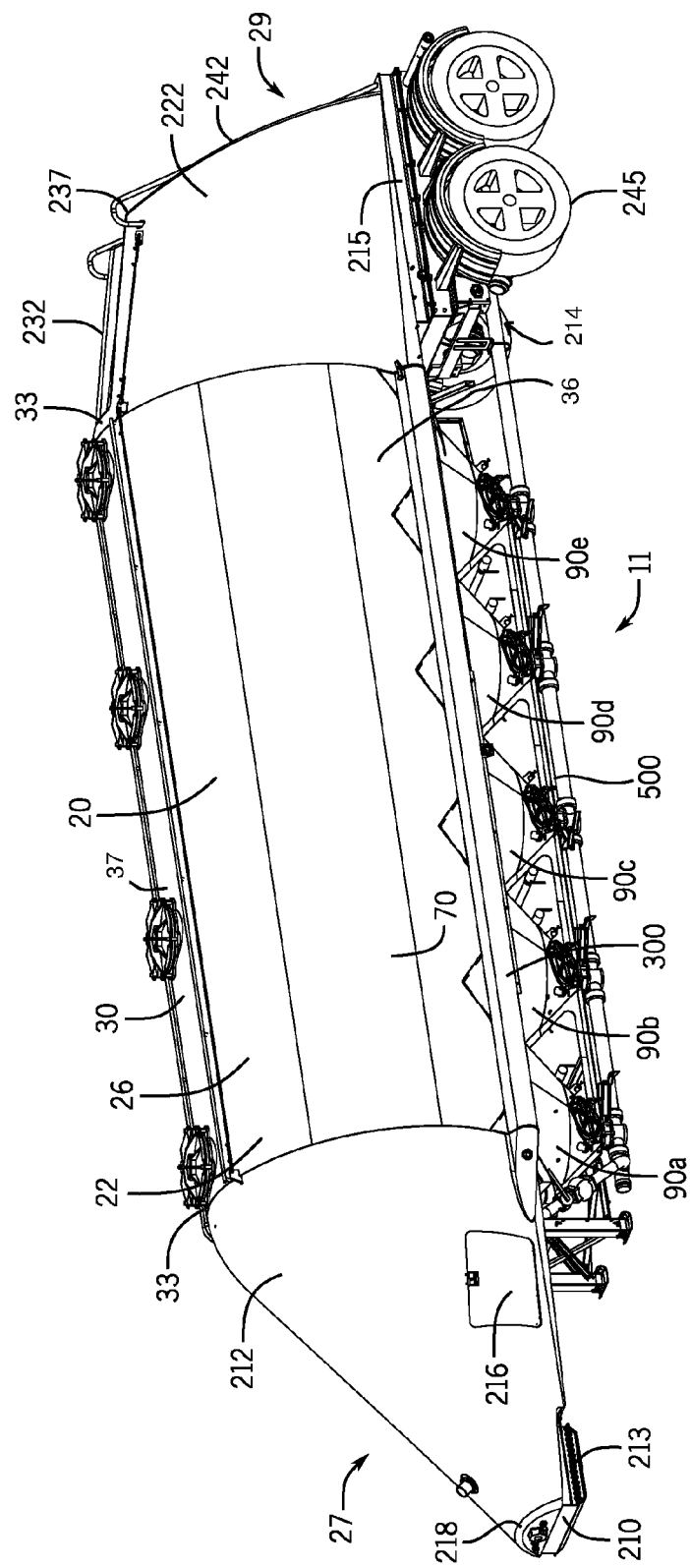
FIG. 12 is a perspective view of the second trailer.
Figure 13:
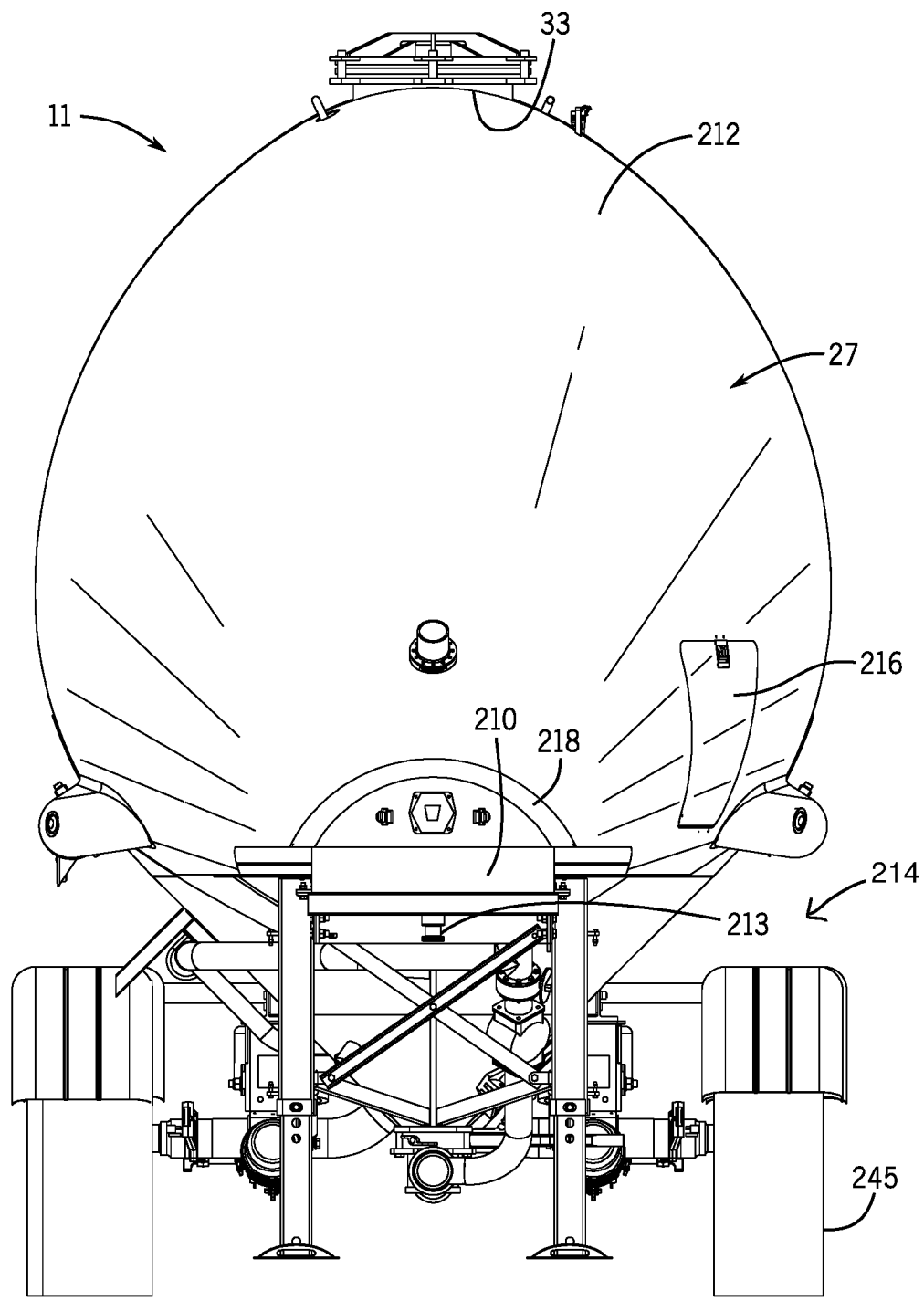
FIG. 13 is a front view of the second trailer.
Figure 14:
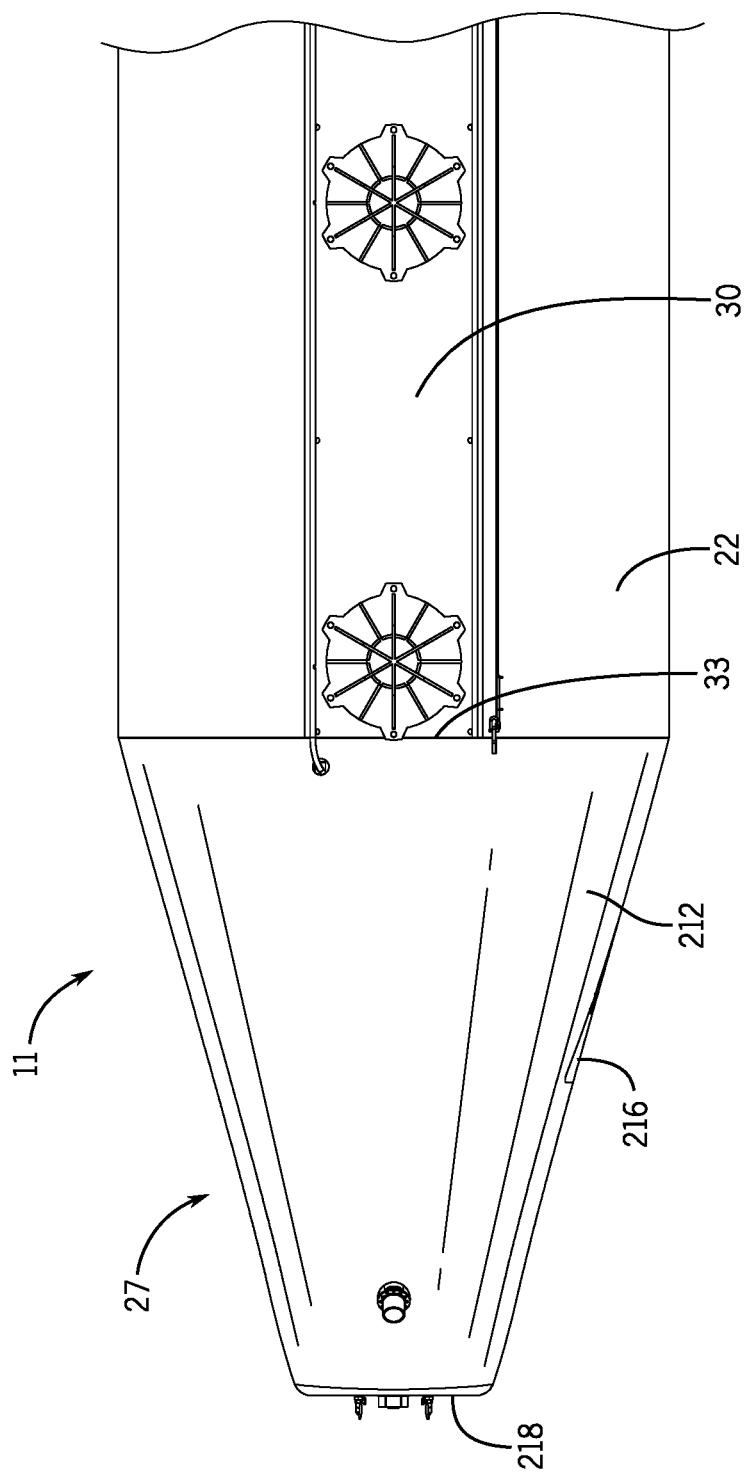
FIG. 14 is a top down view of the front section of the second trailer.

In another aspect, a trailer 11 is shown in FIGS. 11 and 12. The trailer 11 is generally the same or similar to trailer 10 in construction, except for a front end cover 212 and a rear end cover 222. Other like or similar components or structures between the trailer 10 and the trailer 11 are numbered the same in FIGS. 11 and 12. The trailer 11 includes the front end cover 212 that slopes down at an angle of approximately 10 degrees to approximately 55 degrees. The front end cover 212 substantially covers the front end cone 201 of the tank 20. The front end cover 212 extends from the top surface 30 of the barrel portion 26 and encloses the front end portion 27 of the trailer 11. The front end cover 212 extends from the top surface 30 of the barrel portion 26 to the front deck 210 of the trailer 11. The front end cover 212 may extend from the top surface 30 of the barrel portion 26 to a leading surface 218 of the front end cover 212 at an angle of approximately 10 degrees to approximately 55 degrees. The front end cover 212 provides an aerodynamic leading surface for the trailer 11 that covers the front end cone 201. Sides of the front end cover 212 also angle or taper inwards toward the leading surface 218 of the front end cover 212. The sides of the front end cover 212 may angle or taper inwards at an angle of approximately 10 degrees to approximately 25 degrees.

In the aspect shown in FIGS. 11 and 12, the front end cover 212 slopes down from the top surface 30 at an angle of approximately 45 degrees. At this angle, the front end cover 212 covers the front end cone 201, which may be formed with steeper sides to more closely match the angle of repose of the material filled into the tank 20. The front end cover 212 generally encloses the front end portion 27 of the trailer 11. The front end cover 212 slopes from the barrel portion 26 to a kingpin 213 and/or the front deck 210 of the trailer 11.

The front end cover 212 blends into the outer surface 22 of the tank 20 at a seam 33. The top surface 30 has a generally zero slope leading into the seam 33, and the front end cover 212 slopes down from the seam 33 at an angle of approximately 45 degrees.

The front end cover 212 includes an access 216, such as a hatch, door, or other removable cover that provides access to the plumbing and support structure of the trailer 11. The front end cover 212 is not an integral portion of the trailer 20, i.e., the trailer 20 may be filled and towed without the front end cover 212. The front end cover 212 may be made from aluminum, fiberglass or other suitable materials.

The trailer 11 also includes the rear end cover 222 that slopes generally down from the top surface 30 of the barrel portion 26 at an angle of approximately 5-15 degrees and in from the sides 70 and 80 of the barrel portion 26 at an angle of approximately 5-15 degrees. The rear end cover 222 substantially covers the rear end cone 221. The rear end cover 222 may extend from the top surface 30 to the rear deck 215. The rear end cover 222 may cover the entire distance between the top surface 30 and the rear deck 215. The rear end cover 222 may blend into the top surface 30 at a seam 33. The top surface 30 has a generally zero slope leading into the seam 33. At the seam 33, the rear end cover 222 slopes downward at the angle of approximately 5-15 degrees.

The rear end cover 222 includes a front portion 232 and a rear portion 242. The front portion 232 may slope downward at an angle of approximately 5-15 degrees. At the rear portion 242 of the rear end cover 222, the slope increases to approximately 45 degrees to 65 degrees or more in the downward direction. A transition point 237 may separate the front portion 232 from the rear portion 242. At the transition point 237, the slope of the rear end cover 222 increases from 5-15 degrees to approximately 45 degrees to 65 degrees. The rear end cover 222 could be formed with steps or a ladder that allows access to the top surface 30 of the trailer 11.

The rear end cover 222 may be made of aluminum, fiberglass, or other suitable materials. The rear end cover 222 includes an access, such as a hatch, door, or other removable cover that provides access to tanks, hoses, etc. stored in the rear end portion 29 of the trailer 11.

It should be understood from the foregoing that, while particular embodiments of the invention have been illustrated and described, various modifications can be made thereto without departing from the spirit and scope of the present invention. Therefore, it is not intended that the invention be limited by the specification; instead, the scope of the present invention is intended to be limited only by the appended claim.

What is claimed is:

1. A pneumatic tank trailer having a front end and a rear end spaced apart along a longitudinal axis of the trailer, the trailer comprising:
   a carriage for movement over a road;
   a tank supported on the carriage, the tank comprising a hopper portion including a plurality of hoppers spaced apart along the longitudinal axis of the trailer, the tank further comprising a barrel portion extending up from the hopper portion and defining an interior of the tank in fluid communication with the plurality of hoppers, the barrel portion having a perimeter forming a top and opposite first and second sides of the tank and having an ovoid cross-sectional shape that is continuously curved in such a way as to define one end portion that is more pointed than the rest of the perimeter of the barrel portion.

2. A pneumatic tank trailer as set forth in claim 1, wherein the first and second sides of the tank have curved cross-sectional shapes and the top of the tank has a curved cross sectional shape.

3. A pneumatic tank trailer as set forth in claim 2 wherein the first and second sides of the tank have a minimum cross-sectional radius of curvature and the top has a minimum cross-sectional radius of curvature that is less than the minimum cross-sectional radius of curvature of the first and second sides of the tank.

4. A pneumatic tank trailer as set forth in claim 1 wherein a bottom end segment of each of the first and second sides of the tank slopes inward toward the hopper portion.

5. A pneumatic tank trailer as set forth in claim 1, wherein the barrel portion of the tank has a front end margin and a rear end margin spaced apart along the longitudinal axis of the trailer, the cross-sectional shape of the barrel portion being substantially constant between the front and rear end margins of the barrel portion.

6. A pneumatic tank trailer as set forth in claim 1 further comprising at least one internal rib joined to the barrel portion at the interior of the tank.

7. A pneumatic tank trailer as set forth in claim 6 wherein the internal rib comprises a perimeter portion that extends along the first side, the top, and the second side of the tank.

8. A pneumatic tank trailer as set forth in claim 7 wherein the perimeter portion of the internal rib has an ovoid cross sectional shape.

9. A pneumatic tank trailer as set forth in claim 8 wherein the internal rib further includes a cross-support extending between the first and second sides of the tank.

10. A pneumatic tank trailer as set forth in claim 9 wherein the cross-support is downwardly spaced apart from the top of the tank.

11. A pneumatic tank trailer as set forth in claim 10 wherein the perimeter portion includes a top segment joined to the top of the tank, the cross-support being downwardly spaced apart from the top segment of the perimeter portion.

12. A pneumatic tank trailer as set forth in claim 10 wherein the cross-support is downwardly spaced apart from the top of the tank by about one-third of a height of the tank.

13. A pneumatic tank trailer as set forth in claim 6 wherein the tank comprises a plurality of internal ribs joined to the barrel at spaced apart locations along the longitudinal axis.

14. A pneumatic tank trailer as set forth in claim 13 wherein each of the plurality of internal ribs is positioned along the longitudinal axis generally between adjacent ones of the plurality of hoppers.

15. A pneumatic tank trailer as set forth in claim 14 wherein each of the plurality of internal ribs comprises a bottom perimeter portion joined to a hopper joint area between the respective adjacent ones of the plurality of hoppers.

16. A pneumatic tank trailer as set forth in claim 15 wherein at least the bottom perimeter portion of each of the plurality of internal ribs is formed by a substantially flat plate extending in a plane oriented transverse to the longitudinal axis.

17. A pneumatic tank trailer as set forth in claim 1 wherein the tank comprises a plurality of cross-supports spaced apart along the longitudinal axis of the trailer, each of the cross-supports extending between the first and second sides of the tank and being downwardly spaced apart from the top of the tank.

18. A pneumatic tank trailer as set forth in claim 1 wherein the barrel portion includes an upper barrel portion wall defining the top of the tank and upper segments of the first and second sides of the tank and a lower barrel portion wall defining lower segments of the first and second sides of the tank.

19. A pneumatic tank trailer as set forth in claim 18 wherein the lower barrel portion wall is joined to the upper barrel portion wall.

20. A pneumatic tank trailer as set forth in claim 18 wherein the lower barrel portion wall has an arcuate cross-sectional shape.

21. A pneumatic tank trailer as set forth in claim 17 wherein the each of the hoppers includes an angled wall having a top end margin and a bottom end margin, the lower barrel portion wall being joined to the top end margins of the angled walls of the hoppers.

22. A pneumatic tank trailer as set forth in claim 21 wherein the angled walls of the hoppers has a generally V-shaped cross-sectional shape.

23. A pneumatic tank trailer as set forth in claim 21 wherein the lower barrel portion wall tapers inward as it extends from the upper barrel portion wall to the hoppers.

* * * * *